United States Patent [19]

Kervistin et al.

[11] 4,279,153

[45] Jul. 21, 1981

[54] APPARATUS FOR MEASURING THE TEMPERATURE OF A GAS FLOW TRAVERSING A GRID OF BLADES

[75] Inventors: Robert Kervistin, Le Mee sur Seine; Alain M. J. Lardellier, Melun, both of France

[73] Assignee: Societe Nationale d'Etude et de Construction de Moteurs d'Aviation, Victor, France

[21] Appl. No.: 73,361

[22] Filed: Sep. 7, 1979

[30] Foreign Application Priority Data

Sep. 12, 1978 [FR] France .................. 78 26636

[51] Int. Cl.³ ........................................... G01K 11/00
[52] U.S. Cl. .................................................... 73/357
[58] Field of Search ......................... 73/357, 346, 116

[56] References Cited

U.S. PATENT DOCUMENTS 3,098,387 7/1963 Corbett ................................ 73/357

FOREIGN PATENT DOCUMENTS 1449392 12/1966 France .
734702 8/1955 United Kingdom .

Primary Examiner—Jerry W. Myracle
Attorney, Agent, or Firm—Oblon, Fisher, Spivak, McClelland & Maier

[57] ABSTRACT

Apparatus is disclosed which is intended to measure the temperature of a gas flow traversing a blade grid, for example the valve blades of a turbojet turbine. This apparatus comprises a temperature sounder lodged within a gas escape circuit provided in a blade. In-flight monitoring of the gas temperature in an aircraft turbojet is possible with the present invention.

14 Claims, 2 Drawing Figures

APPARATUS FOR MEASURING THE TEMPERATURE OF A GAS FLOW TRAVERSING A GRID OF BLADES

BACKGROUND OF THE INVENTION

1. Field of the Invention

The invention concerns an apparatus intended for continuously measuring the temperature of a flow of gas within a grid of blades constituted by a plurality of stationary blades disposed in a crankcase which delimits the flow. In particular, the invention contemplates an apparatus for measuring the temperature of gases within a turbojet turbine stage valve.

2. Description of the Prior Art

It is known that in jet-propelled aircraft, it is necessary to measure the temperature of the gases traversing the turbine and to display that temperature by means of gauges disposed on the control panel so that the pilot may be assured at all times that this temperature does not reach a dangerous level. The measurements are carried out by means of sounders or captors, generally thermocouples, connected to the gauges.

In engines having two turbine stages separated by an intermediate crankcase, sounders may be disposed within the crankcase. This solution is not possible in compact engines not having such a crankcase. The sounders may not be disposed between the outlet valve blades since in that position they would cause a considerable partial obstruction. In a known solution, the sounders may be integrated with the leading edges of certain stationary blades. However, it is difficult to effectively protect the sounder conductor links against thermal and chemical damage from the gases. This becomes more difficult as the number of conductors increases. In practice, it is necessary to dispose the sounders on several radii of the jet stream section so as to obtain a suitable measure of the average gas temperature within the section. By way of example, it is necessary to dispose six sounders in a 120 blade valve. At three conductors per sounder, there are then 18 wires which must be placed and protected against damage from ambient conditions.

SUMMARY OF THE INVENTION

The invention eliminates these problems, particularly in double flow jets, by enabling the sounders and their conductor links to be moved outside of the jet stream. According to its most general form, the apparatus of the invention is intended to measure the temperature of a gas flow traversing a grid of blades constituted by a plurality of stationary blades disposed within a crankcase which delimits the flow. The blades are affixed to said crankcase at their heels and their vanes extending toward the axis of the crankcase. The apparatus includes at least one stationary blade in which a channel is provided, which extends along a fraction of the length of the vane. The channel issues forth from the heel through an opening facing the interior wall of the crankcase and communicating with the flow of gas through at least one opening provided in a surface of the vane. An opening is provided in the crankcase across from the opening in the heel of the blade so as to constitute, together with the channel in the blade, an escape circuit for gas. Further included is a temperature sounder delivering a signal of measurement of it own temperature through an electric connection and structure for maintaining the sounder in the escape circuit where it is brushed by the gases.

All of the problems set forth above are thus removed by the invention, since the presence of temperature sounders and their wiring is avoided at all points of flow of the gas traversing the valve.

Furthermore, if the blade channel is made to communicate with the flow of gas through a plurality of openings spaced along a line of generation on the vane, the measurement of the average temperature of the gas in various radii of the jet stream, corresponding respectively to the location of said openings, is performed by a single sounder. In other words, the invention enables considerable reduction of the number of sounders required.

It will be seen in particular that anti-radiation screens, judiciously disposed in the escape circuit enable precise temperature measurements even though the escape rate is very low.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
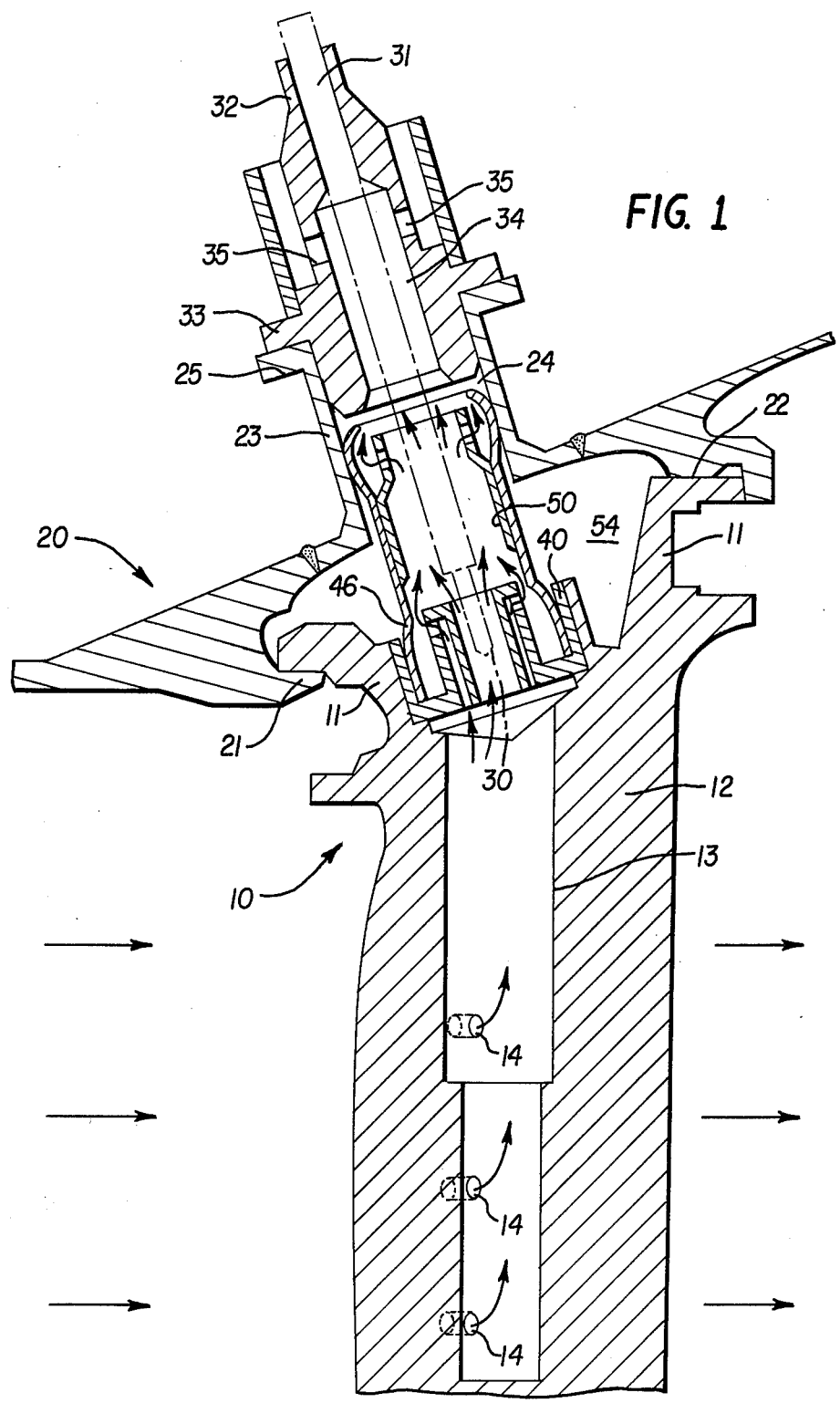
FIG. 1 is a partial axial cutaway of the apparatus of the invention, in the double flow turbojet turbine valve.
Figure 2:
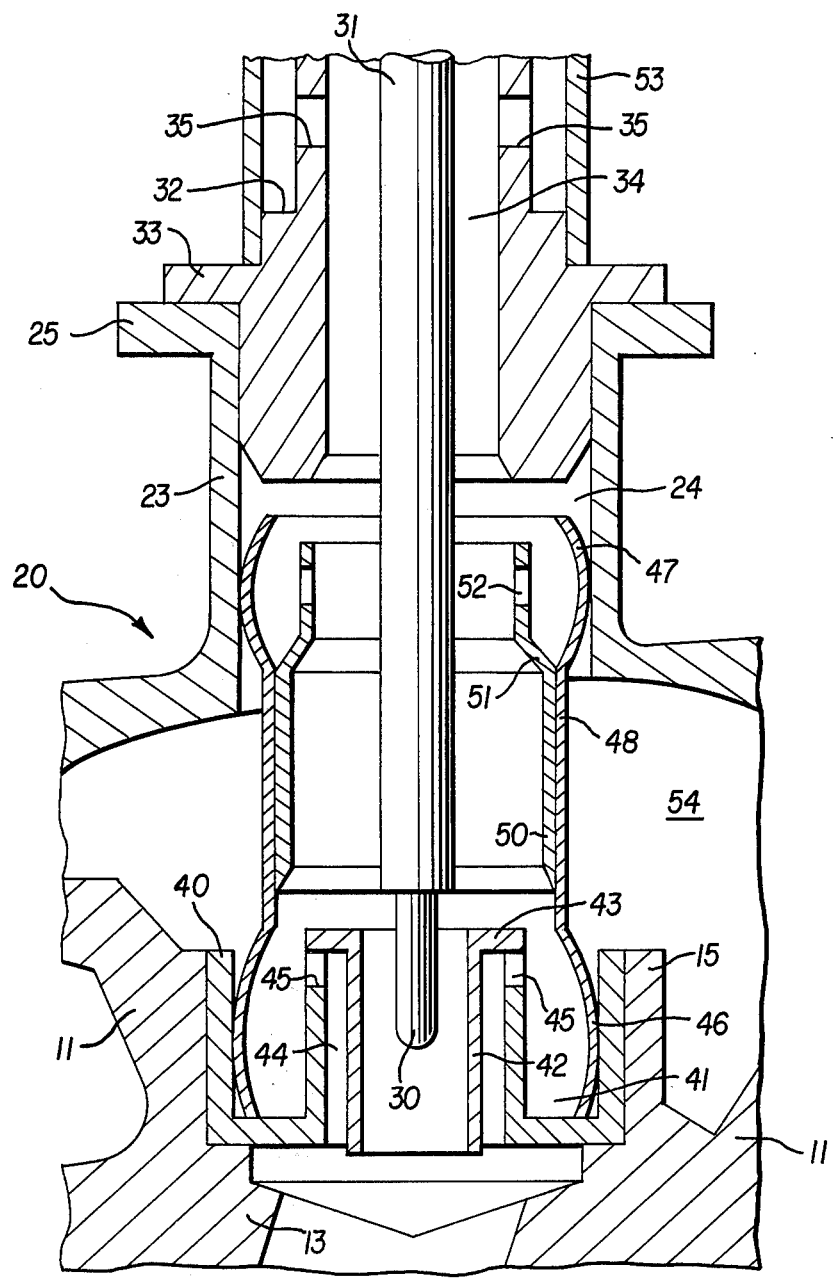
FIG. 2 represents a detail of a central part of said axial cutaway.

FIGS. 1 and 2 will be considered simultaneously. Blade 10 forms part of the valve of turbine HP of a double flow turbojet. Crankcase 20, around which circulates secondary air intended for after-burning, constitutes the jet stream in which circulates the primary combustion gases. The direction of flow of the gas is indicated by the feathered arrows.

Blade 10 is applied by its heel 11 against bearing surfaces 21 and 22 of crankcase 20. The fastening elements are not shown. A radially oriented one-eyed channel 13 is drilled in one part of the length of vane 12 of the blade. It communicates with the combustion gas flow through three openings 14 which open at the back of the vane. The external wall of crankcase 20 bears a cylindrical boss 23 disposed facing channel 13. A bore 24 is drilled in the boss 23, which is equipped with an end flange 25.

The temperature sounder used is a thermocouple 30 of which the outflow wires are enclosed in a sheath 31 which is disposed in the bore 24 so that the solder joint of the thermocouple is placed at the opening of channel 13. Sheath 31 is inserted in the bore of a support sleeve 32 affixed by its flange 33 upon flange 25 of boss 23 and centered in bore 24 by a cylindrical supporting surface. A cylindrical chambering 34 provided in the part of sleeve 32 situated on either side of flange 33 separates from sheath 31 and, together with the latter, defines an annular space which communicates with the space outside of crankcase 20 by lateral openings 35. Drilled hole 13 of vane 10 and bore 24 of boss 23 thus combine with chambering 34 and openings 35 of support 32 to form an escape circuit in which a very minimal fraction of the primary combustion gas flow circulating within crankcase 20 escapes into the secondary air stream and brushes the extremity of the sounder. The directions of gas circulation in this escape circuit are shown by the non-feathered arrows. The escape flow results from the mixture of the flows passing through the three openings 14 provided in the back of vane 10. Since these openings are disposed at different distances from the axis of the crankcase, the temperature measured by means of couple 30 is therefore the average of the combustion gas temperature at three different radial levels in the jet stream. With prior art devices using sounders or couples disposed within the combustion gas flow, it would have been necessary to use three couples to obtain the same result.

In accordance with the invention, the apparatus is further provided so as to obtain an optimal response time for the sounders, to reduce their radiation heat losses to a negligible value, and to avoid direct contact between the hot gases of the escape circuit and the structure of the engine.

To endow sounder 30 with as short a response time as possible, a ring 40, operating as a nozzle, is soldered within a chambering 15 provided within heel 11 at the mouth of channel 13. Ring 40 restricts the escape flow around sounder 30 and the acceleration which it imparts locally to the gas increases its thermal exchange coefficient with the sounder. An annular throat 41 is provided in the circumference of ring 40 so as to reduce the thickness of its walls, which in turn is intended to reduce both its thermal inertia and heat loss by conduction. Furthermore, a cylindrical sleeve 42 having thin walls (of which the external diameter is smaller than the diameter of the bore or ring 40 so as to provide an annular conduit 44) is lodged within said ring 40. The cylindrical sleeve 42 is fixed on the external extremity thereof to ring 40 by soldering its flange 43. Slots 45, hollowed in ring 40, form issues for the gases circulating in conduit 44. Thus sleeve 42, of which the external and internal circumferences are surrounded by gases of the same temperature, forms a thermal screen of very low calorific inertia, mitigating against the heat losses of sounder 30 which may occur by radiation from the latter to ring 40 and through conduction from the latter into blade heel 11.

The part of sheath 31 which is situated between nozzle ring 40 and support sleeve 32 is surrounded by a sleeve 48 having thin walls. The latter comprises two bulges 46 and 47 respectively situated at its two extremities. Bulge 46 is in contact with the internal circumference of the external cylindrical surface of ring 40 and the corresponding extremity of sleeve 48 butts against the bottom of annular throat 41. Bulge 47 is tightly jointed in bore 24. Sleeve 48, thus centered by its two bulges 46 and 47, plays a double role. It forms between nozzle 40 and bore 24 a quasi airtight conduit which prevents the escape flow gases from circulating in the annular space 54 existing between crankcase 20 and the heels of all of the vanes of the valve. It also constitutes a thermal screen acting against radiation from the part of sleeve 31 which it surrounds. The contact between bulge 47 and the surface of bore 24 may nevertheless give rise to minimal heat losses. For an additional precaution, a second sleeve 50 may be inserted in sleeve 48, said second sleeve also having thin walls and a retainer 51 in its end part facing bulge 47. Openings 52 provided in the retainer enable a fraction of the gases to escape through the annular space thus formed. This retained gas thus constitutes an additional thermal screen.

Finally, a deflecting sleeve 53 surrounds (without touching) the surface of the support cap 32 into which issue the escape circuit gas exit openings 35. It reduces the output speed of these gases and prevents them from striking directly against the structural components of the engine adjoining boss 23.

The embodiment just described concerns an apparatus conforming to the invention, usable in a double flow turbojet in which a very minimum output of gas from the excape circuit escapes into the secondary air stream. In a single flow engine, the gases may be allowed to escape into the atmosphere without harm. However, they may also be brought back into the principal gas flow. For example, sleeve 53 may constitute one extremity of a readmission tube of which the other extremity empties into the principal flow below the turbine.

Sounder 30 may, according to the conditions of use, be constituted by a thermoelectric couple as well as by a captor of a different type, such as a platinum resistance or a temperature effective semiconductor.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for measuring the temperature of a gas flow, said apparatus comprising:
   a crankcase having an axis;
   a grid of blades constituted by a plurality of stationary blades having heels, said blades being disposed in said crankcase and affixed by their heels to said crankcase with the vanes of said blades extending towards said axis;
   a channel extending through at least a portion of the length of at least one of said vanes, said channel extending towards said axis from an aperture in said heel of said vane, said aperture facing the interior surface of said crankcase;
   a plurality of openings in said at least one vane, spaced along a line of generation on the surface thereof, said openings extending into said channel so as to communicate the gases in said crankcase with said channel;
   an aperture in the surface of said crankcase and facing said aperture in said heel wherein said apertures and said channel form a gas escape circuit;
   a temperature sounder including an electrical connection for delivering a signal corresponding to the temperature of said sounder;
   means for maintaining said sounder in said escape circuit and in communication with said gases, said means comprising a nozzle fixed in said escape circuit and surrounding said sounder.

2. The apparatus of claim 1, wherein a cylindrical sleeve is lodged between said nozzle and said sounder to form an anti-radiation screen whose internal lateral surface and external lateral surface are in contact with said gases.

3. The apparatus of claim 1 or claim 2 including a sleeve connecting the opening in the heel of the blade to the opening in the crankcase so as to form a gas conduit.

4. The apparatus of claim 3 including a sheath support in the form of a sleeve inserted at least partially within said boss bore, said sleeve including a bore in which the sheath is inserted and at least one gas outlet opening.

5. The apparatus of claim 4, wherein said sleeve supports a deflecting screen in front of said gas outlet opening.

6. An apparatus for measuring the temperature of a gas flow in a turbojet turbine valve, said apparatus comprising:

a turbine rotor in a turbine crankcase;

a plurality of stationary blades disposed within the intake section of said turbine, said blades having heels and vanes and being affixed to said crankcase at said heels with said vanes extending towards the axis of said rotor;

a channel extending through at least a portion of the length of at least one of said vanes, said channel communicating with the gases flowing through said crankcase by means of a plurality of openings extending from the surface of said at least one vane to said channel, said plurality of openings being positioned along a line of generation on said vane, said channel terminating in an aperture of said heel, said aperture facing the interior wall of said crankcase and forming, together with said channel and openings, a gas escape path;

a boss including a bore, said boss being affixed to the external surface of said crankcase in opposition to said aperture at said heel;

a temperature sounder positioned in said escape path, said sounder including an electrical connection for delivering a signal corresponding to the temperature of said sounder;

a rigid sheath having one end to which said sounder is fixed, said sheath enclosing said electrical connection;

a sheath support affixing the other end of said sheath to said boss, thereby maintaining said sounder in said escape path, wherein said sheath support comprises a sleeve having a bore, said sleeve being inserted into said boss bore and including at least one gas outlet opening, said sheath being inserted in said sleeve bore; and a nozzle fixed within said escape path and surrounding said sounder.

7. The apparatus of claim 6, wherein said vane channel communicates with the gas flow through a plurality of openings spaced along a generant on the back of said vane.

8. The apparatus of claim 6, further comprising a cylindrical sleeve lodged within said nozzle surrounding said sounder so as to form an anti-radiation screen of which the internal lateral surface and the external lateral surface are in contact with said gases.

9. The apparatus of claim 6 or 8, wherein said nozzle is a ring lodged within said aperture in the blade heel.

10. The apparatus of claim 9, further comprising a tube inserted in said boss bore and connecting the nozzle outlet to said crankcase boss bore so as to form a gas conduit around said sheath.

11. The apparatus of claim 10, wherein said tube is tightly inserted at one end in said boss bore and, at its other end, butts against said nozzle so as to maintain said nozzle in its place.

12. The apparatus of claim 11, wherein the interior of one end of said tube inserted in the boss bore includes a cylindrical anti-radiation screen surrounding said sheath.

13. A turbojet turbine valve including the temperature measurement apparatus of claim 6.

14. A turbojet including the turbine valve of claim 13.

* * * * *